US011993672B2

(12) United States Patent
Chen et al.

(10) Patent No.: US 11,993,672 B2
(45) Date of Patent: *May 28, 2024

(54) PRODUCTION OF HIGH MELT FLOW PROPYLENE-BASED POLYMER AND PRODUCT FROM SAME

(71) Applicant: W.R. GRACE & CO.-CONN., Columbia, MD (US)

(72) Inventors: Linfeng Chen, Missouri City, TX (US); Tak W. Leung, Houston, TX (US); Tao Tao, Houston, TX (US); Kuanqiang Gao, Pearland, TX (US)

(73) Assignee: W.R. Grace & Co.-Conn., Columbia, MD (US)

( * ) Notice: Subject to any disclaimer, the term of this patent is extended or adjusted under 35 U.S.C. 154(b) by 127 days.

This patent is subject to a terminal disclaimer.

(21) Appl. No.: 17/553,687

(22) Filed: Dec. 16, 2021

(65) Prior Publication Data

US 2022/0177611 A1 Jun. 9, 2022

Related U.S. Application Data

(63) Continuation of application No. 16/445,865, filed on Jun. 19, 2019, now Pat. No. 11,254,756, which is a continuation of application No. 13/993,503, filed as application No. PCT/US2011/066013 on Dec. 20, 2011, now Pat. No. 10,358,505.

(60) Provisional application No. 61/425,358, filed on Dec. 21, 2010.

(51) Int. Cl.
| | | |
|---|---|---|
| C08F 4/64 | (2006.01) | |
| C08F 4/00 | (2006.01) | |
| C08F 4/16 | (2006.01) | |
| C08F 4/60 | (2006.01) | |
| C08F 110/06 | (2006.01) | |
| C08F 4/609 | (2006.01) | |
| C08F 4/642 | (2006.01) | |

(52) U.S. Cl.
CPC .......... C08F 4/00 (2013.01); C08F 4/16 (2013.01); C08F 110/06 (2013.01); *C08F 4/6094* (2013.01); *C08F 4/6421* (2013.01); *C08F 4/6425* (2013.01); *C08F 4/6426* (2013.01)

(58) Field of Classification Search
CPC .. C08F 4/60; C08F 4/64; C08F 4/6425; C08F 4/6426
See application file for complete search history.

(56) References Cited

U.S. PATENT DOCUMENTS

| | | | |
|---|---|---|---|
| 4,342,856 A | 8/1982 | Patnaik | |
| 4,442,276 A | 4/1984 | Kashiwa et al. | |
| 4,460,701 A | 7/1984 | Terano et al. | |
| 4,540,679 A | 9/1985 | Arzoumanidis et al. | |
| 4,547,476 A | 10/1985 | Terano et al. | |
| 4,816,433 A | 3/1989 | Terano et al. | |
| 4,829,037 A | 5/1989 | Terano et al. | |
| 4,927,797 A | 5/1990 | Ewen | |
| 4,990,479 A | 2/1991 | Ishimaru et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,106,806 A | 4/1992 | Job | |
| 5,146,028 A | 9/1992 | Job | |
| 5,151,399 A | 9/1992 | Job | |
| 5,153,158 A | 10/1992 | Kioka et al. | |
| 5,229,342 A | 7/1993 | Job | |
| 5,247,031 A | 9/1993 | Kioka et al. | |
| 5,247,032 A | 9/1993 | Kioka et al. | |
| 6,825,146 B2 | 11/2004 | Kilty et al. | |
| 6,825,149 B2 | 11/2004 | Khanmamedova | |
| 7,935,766 B2 | 5/2011 | Sheard et al. | |
| 8,106,138 B2 | 1/2012 | Sheard et al. | |
| 8,263,692 B2 | 9/2012 | Sheard et al. | |
| 8,288,585 B2 * | 10/2012 | Chen | C08F 4/6494 |
| | | | 562/124 |
| 8,536,372 B2 | 9/2013 | Chen et al. | |
| 8,604,235 B2 * | 12/2013 | Chen | C07C 69/78 |
| | | | 560/85 |
| 9,481,745 B2 | 11/2016 | Mignogna et al. | |
| 9,873,752 B2 | 1/2018 | Singh et al. | |
| 10,246,532 B2 | 4/2019 | Chevalier et al. | |
| 10,358,505 B2 | 7/2019 | Chen et al. | |
| 11,254,756 B2 * | 2/2022 | Chen | C08F 4/16 |
| 2009/0203863 A1 | 8/2009 | Chen | |
| 2009/0209706 A1 | 8/2009 | Sheard et al. | |
| 2010/0168342 A1 | 7/2010 | Sheard et al. | |
| 2010/0222530 A1 | 9/2010 | Chen et al. | |
| 2013/0261273 A1 | 10/2013 | Chen et al. | |

(Continued)

FOREIGN PATENT DOCUMENTS

| | | | |
|---|---|---|---|
| WO | WO-2010/078479 A1 | 7/2010 | |
| WO | WO-2010/078480 A1 | 7/2010 | |

(Continued)

*Primary Examiner* — Rip A Lee

(74) *Attorney, Agent, or Firm* — Foley & Lardner LLP

(57) ABSTRACT

Disclosed are catalyst compositions having an internal electron donor which includes a 3,6-di-substituted-1,2-phenylene aromatic diester. Ziegler-Natta catalyst compositions containing the present catalyst compositions exhibit very high hydrogen response, high activity, high selectivity and produce propylene-based olefins with high melt flow rate.

14 Claims, No Drawings

(56) References Cited

U.S. PATENT DOCUMENTS

| | | |
|---|---|---|
| 2013/0338321 A1 | 12/2013 | Coalter et al. |
| 2016/0090428 A1 | 3/2016 | Mignogna et al. |
| 2016/0347880 A1 | 12/2016 | Bantu et al. |

FOREIGN PATENT DOCUMENTS

| | | |
|---|---|---|
| WO | WO-2010/078485 A1 | 7/2010 |
| WO | WO-2010/078494 A2 | 7/2010 |
| WO | WO-2010/078503 A1 | 7/2010 |
| WO | WO-2010/078512 A2 | 7/2010 |
| WO | WO-2010/078519 A1 | 7/2010 |

* cited by examiner

PRODUCTION OF HIGH MELT FLOW PROPYLENE-BASED POLYMER AND PRODUCT FROM SAME

CROSS-REFERENCE TO RELATED APPLICATIONS

This application claims the benefit of priority to U.S. patent application Ser. No. 16/445,865, filed on Jun. 19, 2019, which claims priority to U.S. patent application Ser. No. 13/993,503, filed on Jun. 12, 2013 as a U.S. National Phase Application of PCT/US2011/066013, filed on Dec. 20, 2011, which claims priority to Provisional Patent Application No. 61/425,358 filed Dec. 21, 2010, all of which are hereby incorporated by reference, in their entirety for any and all purposes.

BACKGROUND

Known is the incorporation of substituted phenylene aromatic diester as an internal electron donor in olefin polymerization catalyst compositions. In particular, the internal electron donor, 5-tert-butyl-3-methyl-1,2-phenylene dibenzoate in Ziegler-Natty catalyst compositions, contributes to high catalyst activity and high selectivity during polymerization to produce propylene-based polymer with high isotacticity.

Given the perennial emergence of new applications for olefin-based polymers, the art recognizes the need for olefin-based polymers with improved and varied properties. Desirable would be Ziegler-Natta catalyst compositions for the production olefin-based polymers that exhibit high catalyst activity during polymerization and produce propylene-based polymers with high melt flow rate, high isotacticity, and/or high catalyst activity.

SUMMARY

The present disclosure is directed to procatalyst compositions containing a substituted phenylene aromatic diester as an internal electron donor and the application of the same in catalyst compositions and polymerization processes. The substituted phenylene catalyst compositions of the present disclosure demonstrate high activity and high hydrogen response during polymerization. In addition, the present substituted phenylene aromatic diester-containing catalyst compositions produce propylene-based olefins with high isotacticity, broad molecular weight distribution, and high, or very high, melt flow rate.

The disclosure provides a process. In an embodiment, a process for producing a propylene-based polymer is provided and includes contacting, under polymerization conditions and in the presence of hydrogen ($H_2$), propylene and optionally one or more comonomers with a catalyst composition. The catalyst composition includes a procatalyst composition, a cocatalyst, and an external electron donor. The procatalyst composition includes a 3,6-di-substituted-1,2-phenylene dibenzoate. The process further includes maintaining a $H_2$/propylene mole ratio greater than or equal to 0.005 during the contacting; and forming a propylene-based polymer having a melt flow rate greater than 10 g/10 min.

In an embodiment, the process includes maintaining the $H_2$/propylene mole ratio from greater than 0.005, or greater than or equal to 0.03 to less than or equal to 0.5, or less than or equal to 0.1 and forming a propylene-based polymer having a melt flow rate greater than 100 g/10 min.

The disclosure provides a composition. In an embodiment, a catalyst composition is provided and includes a procatalyst composition, a cocatalyst, and an external electron donor. The procatalyst composition includes a magnesium moiety, a titanium moiety and an internal electron donor. The internal electron donor includes a 3,6-di-substituted-1,2-phenylene aromatic diester having the structure (I) below.

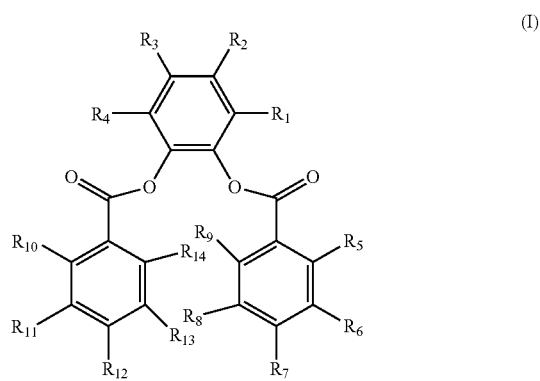

$R_1$-$R_{14}$ are the same or different. Each of $R_1$ and $R_4$ is selected from a methyl group, an ethyl group, and a vinyl group. Each of $R_2$ and $R_3$ is selected from hydrogen, a secondary alkyl group, a tertiary alkyl group, an aryl group and an alkylaryl group, with $R_2$ and $R_3$ not concurrently hydrogen. Each of $R_5$-$R_{14}$ is selected from hydrogen, a halogen, a hydrocarbyl group having 1 to 20 carbon atoms, and a hydrocarbyloxy group having 1 to 20 carbon atoms.

The disclosure provides another composition. In an embodiment, a polymeric composition is provided and includes a propylene-based polymer. The propylene-based polymer contains a 3,6-di-substituted-1,2-phenylene aromatic diester. The propylene-based polymer has a melt flow rate greater than 200 g/10 min.

In an embodiment, the propylene-based polymer is a propylene homopolymer and has a xylene solubles content from 1 wt % to 4 wt %.

An advantage of the present disclosure is the provision of an improved procatalyst composition.

An advantage of the present disclosure is the provision of an improved catalyst composition for the polymerization of olefin-based polymers.

An advantage of the present disclosure is a catalyst composition that contains a substituted phenylene aromatic diester, the catalyst composition exhibiting improved activity during polymerization.

An advantage of the present disclosure is a catalyst composition that contains a substituted phenylene aromatic diester and has high hydrogen response and produces a propylene-based olefin with high melt flow rate.

An advantage of the present disclosure is provision of an in-reactor high melt flow propylene-based polymer that does not require peroxide cracking.

DETAILED DESCRIPTION

The disclosure provides a process. In an embodiment, a process for producing an olefin-based polymer (such as a propylene-based polymer) is provided. The process includes contacting, under polymerization conditions and in the presence of hydrogen ($H_2$), an olefin and optionally one or more comonomers with a catalyst composition comprising a procatalyst composition comprising a 3,6-di-substituted-1,2-phenylene dibenzoate, a cocatalyst, and an external electron donor. The process includes maintaining a H₂/olefin mole ratio from greater than or equal to 0.005, or greater than or equal to 0.005 to less than or equal to 0.5, or less than or equal to 0.1 during the contacting and forming an olefin-based polymer having a melt flow rater greater than 50 g/10 min.

In an embodiment, the olefin is propylene and the process includes contacting propylene and optionally one or more olefin comonomers in the presence of hydrogen (H₂), with the catalyst composition containing the 3,6-di-substituted-1,2-phenylene dibenzoate, a cocatalyst, and an external electron donor. The process includes maintaining a H₂/propylene mole ratio from 0.005 to less than 0.01 during the contacting and forming a propylene-based polymer having a melt flow rater greater than 50 g/10 min.

Procatalyst

The 3,6-di-substituted-1,2-phenylene dibenzoate has the structure (I) below:

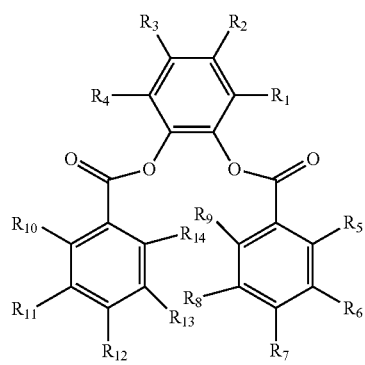

wherein $R_1$-$R_{14}$ are the same or different. Each of $R_1$ and $R_4$ is selected from a substituted hydrocarbyl group having 1 to 20 carbon atoms and an unsubstituted hydrocarbyl group having 1 to 20 carbon atoms.

Each of $R_2$-$R_3$ is selected from hydrogen, halogen, a substituted hydrocarbyl group having 1 to 20 carbon atoms, and an unsubstituted hydrocarbyl group having 1 to 20 carbon atoms.

Each of $R_5$-$R_{14}$ is selected from hydrogen, halogen, a substituted hydrocarbyl group or a substituted hydrocarbyloxy group having 1 to 20 carbon atoms and an unsubstituted hydrocarbyl group or an unsubstituted hydrocarbyloxy group having 1 to 20 carbon atoms. Any two or more hydrocarbyl groups in $R_1$-$R_4$ or $R_5$-$R_{14}$ may link to form a cyclic structure.

In an embodiment, each of $R_5$-$R_{14}$ is hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

The procatalyst precursor can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable procatalyst precursors include halides, oxyhalides, and alkoxides of magnesium, manganese, titanium, vanadium, chromium, molybdenum, zirconium, hafnium, and combinations thereof.

Various methods of making procatalyst precursors are known in the art. These methods are described, inter alia, in U.S. Pat. Nos. 6,825,146, 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In an embodiment, the preparation of the procatalyst precursor involves halogenation of mixed magnesium and titanium alkoxides, and may involve the use of one or more compounds, referred to as "clipping agents", that aid in forming specific, low molecular weight, compositions of the desired morphology. Nonlimiting examples of suitable clipping agents include trialkylborates, especially triethylborate, phenolic compounds, especially cresol, and silanes.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di ($C_{1-4}$) alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein RC is an aliphatic or aromatic hydrocarbon radical having 1 to 14 carbon atoms or COR' wherein $R^e$ is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In an embodiment, the procatalyst precursor is a benzoate-containing magnesium chloride material ("BenMag"). As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Michigan. In an embodiment, the BenMag procatalyst precursor may be a product of halogenation of any procatalyst precursor (i.e., a MagMo precursor or a MagTi precursor) in the presence of a benzoate compound.

The present procatalyst composition also includes an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites and thus enhances catalyst stereoselectivity. In an embodiment, the internal electron donor includes a substituted phenylene aromatic diester of structure (I).

In an embodiment, the procatalyst precursor is converted to a solid procatalyst by way of halogenation. Halogenation includes contacting the procatalyst precursor with a halogenating agent in the presence of the internal electron donor. Halogenation converts the magnesium moiety present in the procatalyst precursor into a magnesium halide support upon which the titanium moiety (such as a titanium halide) is deposited. Not wishing to be bound by any particular theory, it is believed that during halogenation the internal electron donor (1) regulates the position of titanium on the magnesium-based support, (2) facilitates conversion of the magnesium and titanium moieties into respective halides and (3) regulates the crystallite size of the magnesium halide support during conversion. Thus, provision of the internal electron donor yields a procatalyst composition with enhanced stereoselectivity.

In an embodiment, the halogenating agent is a titanium halide having the formula $Ti(OR^e)_f X_h$ wherein $R^e$ and X are defined as above, f is an integer from 0 to 3; h is an integer from 1 to 4; and f+h is 4. In an embodiment, the halogenating agent is $TiCl_4$. In a further embodiment, the halogenation is conducted in the presence of a chlorinated or a non-chlorinated aromatic liquid, such as dichlorobenzene, o-chlorotoluene, chlorobenzene, benzene, toluene, or xylene. In yet another embodiment, the halogenation is conducted by use of a mixture of halogenating agent and chlorinated aromatic liquid comprising from 40 to 60 volume percent halogenating agent, such as $TiCl_4$.

In an embodiment, the reaction mixture is heated during halogenation. The procatalyst precursor and halogenating agent are contacted initially at a temperature from 0° C. to 60° C., or from 20° C. to 30° C., or from 60° C. to 130° C., and heating is commenced at a rate of 0.1 to 10.0° C./minute, or at a rate of 1.0 to 5.0° C./minute. The internal electron donor may be added later, after an initial contact period between the halogenating agent and procatalyst precursor. Temperatures for the halogenation are from 60° C. to 150° C. (or any value or subrange therebetween), or from 90° C. to 120° C. Halogenation may be continued in the substantial absence of the internal electron donor for a period from 1 to 60 minutes, or from 10 to 50 minutes.

The manner in which the procatalyst precursor, the halogenating agent and the internal electron donor are contacted may be varied. In an embodiment, the procatalyst precursor is first contacted with a mixture containing the halogenating agent and a chlorinated aromatic compound. The resulting mixture is stirred and may be heated if desired. Next, the internal electron donor is added to the same reaction mixture without isolating or recovering of the precursor. The foregoing process may be conducted in a single reactor with addition of the various ingredients controlled by automated process control.

In an embodiment, the procatalyst precursor is contacted with the internal electron donor before reacting with halogenating agent.

Contact times of the procatalyst precursor with the internal electron donor are at least 10 minutes, or at least 15 minutes, or at least 20 minutes, or at least 1 hour at a temperature from at least 25° C., or at least 50° C., or at least 60° C. up to a temperature of 150° C., or up to 120° C., or up to 115° C., or up to 110° C.

In an embodiment, the procatalyst precursor, the internal electron donor, and the halogenating agent are added simultaneously or substantially simultaneously.

The halogenation procedure may be repeated one, two, three, or more times as desired. In an embodiment, the resulting solid material is recovered from the reaction mixture and contacted one or more times in the absence (or in the presence) of the same (or different) internal electron donor components with a mixture of the halogenating agent in the chlorinated aromatic compound for at least about 10 minutes, or at least about 15 minutes, or at least about 20 minutes, and up to about 10 hours, or up to about 45 minutes, or up to about 30 minutes, at a temperature from at least about 25° C., or at least about 50° C., or at least about 60° C., to a temperature up to about 150° C., or up to about 120° C., or up to about 115° C.

After the foregoing halogenation procedure, the resulting solid procatalyst composition is separated from the reaction medium employed in the final process, by filtering for example, to produce a moist filter cake. The moist filter cake may then be rinsed or washed with a liquid diluent to remove unreacted $TiCl_4$ and may be dried to remove residual liquid, if desired. Typically the resultant solid procatalyst composition is washed one or more times with a "wash liquid," which is a liquid hydrocarbon such as an aliphatic hydrocarbon such as isopentane, isooctane, isohexane, hexane, pentane, or octane. The solid procatalyst composition then can be separated and dried or slurried in a hydrocarbon, especially a relatively heavy hydrocarbon such as mineral oil for further storage or use.

In an embodiment, the resulting solid procatalyst composition has a titanium content of from about 1.0 percent by weight to about 6.0 percent by weight, based on the total solids weight, or from about 1.5 percent by weight to about 4.5 percent by weight, or from about 2.0 percent by weight to about 3.5 percent by weight. The weight ratio of titanium to magnesium in the solid procatalyst composition is suitably between about 1:3 and about 1:160, or between about 1:4 and about 1:50, or between about 1:6 and 1:30. In an embodiment, the internal electron donor may be present in the procatalyst composition in a molar ratio of internal electron donor to magnesium of from about 0.005:1 to about 1:1, or from about 0.01:1 to about 0.4:1. Weight percent is based on the total weight of the procatalyst composition.

In an embodiment, the procatalyst composition may be further treated by one or more of the following procedures prior to or after isolation of the solid procatalyst composition. The solid procatalyst composition may be contacted (halogenated) with a further quantity of titanium halide compound, if desired; it may be exchanged under metathesis conditions with an acid chloride, such as phthaloyl dichloride or benzoyl chloride; and it may be rinsed or washed, heat treated; or aged. The foregoing additional procedures may be combined in any order or employed separately, or not at all.

Not wishing to be bound by any particular theory, it is believed that (1) further halogenation by contacting the previously formed procatalyst composition with a titanium halide compound, especially a solution thereof in a halohydrocarbon diluent, and/or (2) further washing the previously formed procatalyst composition with a hydrocarbon or halohydrocarbon at an elevated temperature (100-150° C.), results in desirable modification of the procatalyst composition, possibly by removal of certain inactive or undesired metal compounds that are soluble in the foregoing diluent. Accordingly, in an embodiment, the procatalyst is contacted with a halogenating agent, such as a mixture of a titanium halide and a halohydrocarbon diluent, such as $TiCl_4$ and chlorobenzene, one or more times prior to isolation or recovery. In another embodiment, the procatalyst is washed at a temperature between 100 to 150° C. with chlorobenzene or o-chlorotoluene one or more times prior to isolation or recovery.

The present process for producing a procatalyst composition may comprise two or more embodiments disclosed herein.

In an embodiment, a procatalyst composition is provided which includes a combination of a magnesium moiety, a titanium moiety and an internal electron donor. The internal electron donor includes the 3,6-di-substituted-1,2-phenylene aromatic diester of structure (I). The procatalyst composition is produced by way of the foregoing halogenation procedure which converts the procatalyst precursor and the substituted phenylene aromatic diester donor into the combination of the magnesium and titanium moieties, into which the internal electron donor is incorporated. The procatalyst precursor from which the procatalyst composition is formed can be the magnesium moiety precursor, the mixed magnesium/titanium precursor, or the benzoate-containing magnesium chloride precursor.

In an embodiment, the magnesium moiety is a magnesium halide. In another embodiment, the magnesium halide is magnesium chloride, or magnesium chloride alcohol adduct.

In an embodiment, the titanium moiety is a titanium halide such as a titanium chloride. In another embodiment the titanium moiety is titanium tetrachloride.

In another embodiment, the procatalyst composition includes a magnesium chloride support upon which a titanium chloride is deposited and upon which the internal electron donor is incorporated.

The procatalyst composition includes a 3,6-di-substituted-1,2-phenylene dibenzoate as the internal electron donor. In an embodiment, the 3,6-di-substituted-1,2-phenylene dibenzoate has the structure (I) set forth below.

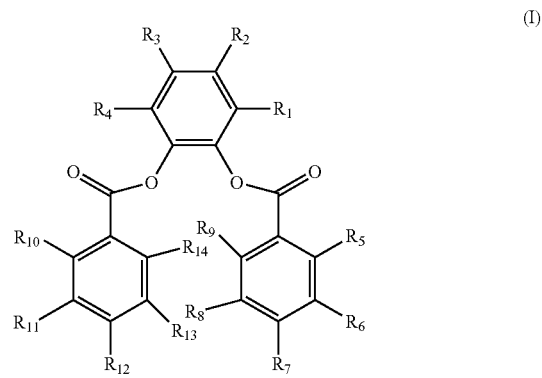

(I)

$R_1$-$R_{14}$ are the same or different. Each of $R_1$ and $R_4$ is selected from a hydrocarbyl group having 1 to 20 carbon atoms. Each of $R_2$ and $R_3$ is selected from hydrogen and a hydrocarbyl group having 1 to 20 carbon atoms. Each of $R_5$-$R_{14}$ is selected from hydrogen, a halogen, a hydrocarbyl group having 1 to 20 carbon atoms, and a hydrocarbyloxy group having 1 to 20 carbon atoms.

In an embodiment, at least one of $R_1$ and $R_4$ is a methyl group.

In an embodiment, each of $R_1$ and $R_4$ is a methyl group.

In an embodiment, each of $R_1$ and $R_4$ is a methyl group. $R_3$ is hydrogen. $R_2$ is selected from an isopropyl group, a cyclopentyl group, a cyclohexyl group, an aryl group, an alkylaryl group, a tert-butyl group, and a 2,3,3-trimethylbutan-2-yl group.

In an embodiment, each of $R_1$ and $R_4$ is a methyl group. Each of $R_2$ and $R_3$ is selected from a methyl group, an ethyl group, an isopropyl group, a cyclopentyl group, a cyclohexyl group, an aryl group, an alkylaryl group, a tert-butyl group, and a 2,3,3-trimethylbutan-2-yl group.

In an embodiment, $R_2$ and $R_3$ are linked to form a cyclic structure.

In an embodiment, $R_5$-$R_{14}$ are hydrogen.

In an embodiment, each of $R_1$ and $R_4$ is selected from a methyl group, an ethyl group, and a vinyl group. Each of $R_2$ and $R_3$ is selected from hydrogen, a secondary alkyl group, a tertiary alkyl group, with $R_2$ and $R_3$ not concurrently being hydrogen. Stated differently, when $R_2$ is hydrogen, $R_3$ is not hydrogen (and vice versa). Each of $R_5$-$R_{14}$ is hydrogen.

In an embodiment, each of $R_1$ and $R_4$ is a methyl group. $R_2$ is an isopropyl group. $R_3$ is hydrogen. Each of $R_5$-$R_{14}$ is hydrogen.

In an embodiment, each of $R_5$, $R_6$, $R_8$, $R_9$, $R_{10}$, $R_{11}$, $R_{13}$, and $R_{14}$ is hydrogen, and $R_7$ and $R_{12}$ are selected from fluorine, chlorine, a methyl group, and an ethyl group.

In an embodiment, the internal electron donor is 3,6-dimethyl-1,2-phenylene dibenzoate.

In an embodiment, the internal electron donor is 3-methyl-6-isopropyl-1,2-phenylene dibenzoate.

In an embodiment, the internal electron donor is 3,6-dimethyl-4-isopropyl-1,2-phenylene dibenzoate.

In an embodiment, the internal electron donor is 1,4,5,5,8,8-hexamethyl-5,6,7,8-tetrahydronaphthalene-2,3-dibenzoate.

In an embodiment, the magnesium moiety is a magnesium chloride. The titanium moiety is a titanium chloride.

Ethoxide content in the procatalyst composition indicates the completeness of conversion of precursor metal ethoxide into a metal halide. The present internal electron donor assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the procatalyst composition includes from about 0.1 wt % to about 30.0 wt %, or from about 1.0 wt % to about 25.0 wt %, or from about 5.0 wt % to about 20.0 wt % 3,6-di-substituted-1,2-phenylene aromatic diester. Weight percent is based on the total weight of the procatalyst composition.

In an embodiment, the procatalyst composition includes from about 0.1 wt % to about 6.0 wt %, or from about 1.0 wt % to about 5.0 wt % titanium. Weight percent is based on the total weight of the procatalyst composition.

In an embodiment, the magnesium to internal electron donor molar ratio is from about 100:1 to about 1:1, or from about 30:1 to about 2:1, or from about 20:1 to about 3:1.

The present process for producing a procatalyst composition may comprise two or more embodiments disclosed herein.

Cocatalyst

The catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In an embodiment, the cocatalyst is selected from triethylaluminum, triisobutylaluminum, tri-n-hexylaluminum, diisobutylaluminum hydride, and di-n-hexylaluminum hydride.

In an embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1. In another embodiment, the molar ratio of aluminum to titanium is about 45:1.

External Electron Donor

The catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In an embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor is an alkoxysilane. The alkoxysilane has the general formula (II):

$$SiR_m(OR')_{4-m} \qquad (II)$$

wherein R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{2-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the external electron donor is selected from one or more of the following: a benzoate, a succinate, and/or a diol ester. In an embodiment, the external electron donor is 2,2,6,6-tetramethylpiperidine. In another embodiment, the external electron donor is a diether.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Nana catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or polycarboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis [4-(vinyloxy) butyl]terephthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleates, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (III):

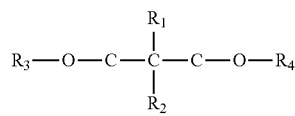

(III)

wherein $R_1$ to $R_4$ are independently of one another an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (IV):

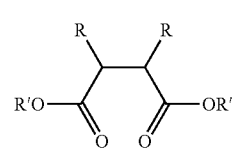

(IV)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (V):

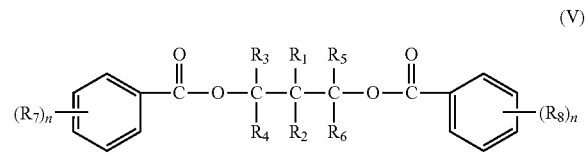

(V)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

In an embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In an embodiment, the mixture is dicyclopentyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In an embodiment, the catalyst composition includes any of the foregoing external electron donors in combination with any of the foregoing activity limiting agents.

In an embodiment, the present catalyst composition includes a mixed external electron donor (M-EED). As used herein, a "mixed external electron donor" ("M-EED") comprises at least two of the following components: (i) a first selectivity control agent (SCA1), (ii) a second selectivity control agent (SCA2), and (iii) an activity limiting agent (ALA). Each SCA can be any alkoxysilane of structure (II) above. In a further embodiment, the M-EED includes an SCA1, an SCA2 and an ALA.

In an embodiment, the M-EED is a mixture of an SCA1 that is a stiffness-promoting composition and an SCA2. A "stiffness-promoting composition," as used herein, is a composition that, but for operation according to the process conditions of the present disclosure, increases or otherwise enhances the stiffness of a resulting polymer under the polymerization conditions of interest. Nonlimiting examples of suitable stiffness-promoting compositions include any of the dimethoxysilanes disclosed above. In a further embodiment, SCA1 is dicyclopentyldimethoxysilane or diisopropyldimethoxysilane.

The SCA2 of the SCA1/SCA2 M-EED is a silicon compound selected from a diethoxysilane, a triethoxysilane, a tetraethoxysilane, a trimethoxysilane, a dimethoxysilane containing two linear alkyl or alkenyl groups or hydrogen, wherein one or more hydrogen atoms may be substituted by a halogen, and any combination thereof. In a further embodiment, SCA2 is selected from methylcyclohexyldiethoxysilane, di-isobutyldiethoxysilane, n-propyltriethoxysilane, tetraethoxysilane, di-n-butyl-dimethoxysilane, benzyltriethoxysilane, but-3-enyltriethoxysilane, 1-(triethoxysilyl)-2-pentene, (triethoxysilyl)cyclohexane, and any combination of the foregoing.

The present catalyst composition may comprise two or more embodiments disclosed herein.

The present process includes contacting an olefin (such as propylene) and optionally one or more comonomers with the catalyst composition under polymerization conditions and in the presence of hydrogen. In an embodiment, the olefin is propylene. The propylene and one or more olefin monomers can be introduced into a polymerization reactor to react with the catalyst composition to form a propylene-based polymer, or a fluidized bed of propylene-based polymer particles. Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnaphthalene; and halogen-substituted $C_{8-40}$ vinyl aromatic compounds such as chlorostyrene and fluorostyrene.

As used herein, "polymerization conditions" are temperature and pressure parameters within a polymerization reactor suitable for promoting polymerization between the catalyst composition and an olefin to form the desired polymer. The polymerization process may be a gas phase, a slurry, or a bulk polymerization process, operating in one, or more than one, reactor.

It is understood that provision of hydrogen in the polymerization reactor is a component of the polymerization conditions. During polymerization, hydrogen is a chain transfer agent and affects the molecular weight (and correspondingly the melt flow rate) of the resultant polymer. The polymerization process may include a pre-polymerization step and/or a pre-activation step.

The present process includes maintaining a hydrogen-to-olefin mole ratio (or a hydrogen-to-propylene mole ratio (or $H_2/C_3$ ratio)) from greater than or equal to 0.005, or from greater than or equal to 0.005 to less than or equal to 0.5, or less than or equal to 0.1 during the contact between the olefin (propylene) and the catalyst composition. Applicants have surprisingly discovered that 3,6-di-substituted-1,2-phenylene dibenzoate of structure (I) unexpectedly improves the hydrogen response of the catalyst composition. In an embodiment, the $H_2/C_3$ mole ratio is from greater than or equal to 0.005, or from greater than or equal to 0.01, or from greater than or equal to 0.02, or from greater than or equal to 0.03 to less than or equal to 0.1, or less or equal to 0.08, or less or equal to 0.06.

The term "hydrogen response," as used herein is the sensitivity of a catalyst composition to the chain transfer agent, hydrogen. A catalyst composition with a "low hydrogen response" requires a large amount of hydrogen to achieve a given melt flow rate (MFR). A catalyst composition with a "high hydrogen response" requires a small amount of hydrogen to achieve a given MFR. High hydrogen response is advantageous because it enables the production of reactor-grade polymer without peroxide cracking. Peroxide cracking increases cost and imparts residuals in the polymer. Additional advantages of a catalyst having high hydrogen response include (1) higher processing speed and (2) shortening the transition time between different polymer grades having different MFRS during production.

In an embodiment, polymerization occurs by way of gas phase polymerization. As used herein, "gas phase polymerization" is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. In an embodiment, the fluidizing medium includes propylene gas and at least one other gas such as an olefin and/or a carrier gas such as hydrogen or nitrogen.

In an embodiment, the contacting occurs by way of feeding the catalyst composition into a polymerization reactor and introducing the olefin into the polymerization reactor. In an embodiment, the cocatalyst can be mixed with the procatalyst composition (pre-mix) prior to the introduction of the procatalyst composition into the polymerization reactor. In another embodiment, cocatalyst is added to the polymerization reactor independently of the procatalyst composition. The independent introduction of the cocatalyst into the polymerization reactor can occur simultaneously, or substantially simultaneously, with the procatalyst composition feed.

In an embodiment, the polymerization process may include a pre-polymerization step. Pre-polymerization includes contacting a small amount of the olefin with the procatalyst composition after the procatalyst composition has been contacted with the co-catalyst and optionally the external electron donor and/or the activity limiting agent. Then, the resulting preactivated catalyst stream is introduced into the polymerization reaction zone and contacted with the remainder of the olefin monomer to be polymerized, and optionally one or more of the external electron donor components. Pre-polymerization results in the procatalyst composition being combined with the cocatalyst and the external electron donor and/or the activity limiting agent, the combination being dispersed in a matrix of the formant polymer. Optionally, additional quantities of the external electron donor and/or the activity limiting agent may be added.

In an embodiment, the polymerization process may include a pre-activation step. Pre-activation includes contacting the procatalyst composition with the co-catalyst and the external electron donor and/or the activity limiting agent. The resulting preactivated catalyst stream is subsequently introduced into the polymerization reaction zone and contacted with the olefin monomer to be polymerized, and optionally one or more of the external electron donor components. Pre-activation results in the procatalyst composition being combined with the cocatalyst and the external electron donor and/or the activity limiting agent. Optionally, additional quantities of the external electron donor and/or the activity limiting agent may be added.

In an embodiment, the process includes mixing the external electron donor (and optionally the activity limiting agent) with the procatalyst composition. The external electron donor can be complexed with the cocatalyst and mixed with the procatalyst composition (pre-mix) prior to contact between the catalyst composition and the olefin. In another embodiment, the external electron donor and/or the activity limiting agent can be added independently to the polymerization reactor. In an embodiment, the external electron donor is dicyclopentyldimethoxysilane or n-propyltrimethoxysilane.

In another embodiment, the catalyst composition includes dicyclopentyldimethoxysilane or n-propyltrimethoxysilane and an activity limiting agent such as isopropyl myristate.

In an embodiment, a polypropylene homopolymer is produced in a first reactor. The content of the first reactor is subsequently transferred to a second reactor into which ethylene is introduced. This results in production of a propylene-ethylene copolymer in the second reactor.

In an embodiment, a propylene homopolymer is formed via introduction of propylene and any of the present procatalyst compositions, cocatalysts, external electron donors, and activity limiting agents in the first reactor. The propylene homopolymer is introduced into the second reactor along with ethylene and optionally an external electron donor and/or an activity limiting agent. The external electron donor and the activity limiting agent may be the same as or different from the respective components used in the first reactor. This produces a propylene-ethylene copolymer in the second reactor.

In an embodiment, the olefin is propylene. The process includes forming a propylene homopolymer having a melt flow rate (MFR) greater than 10 g/10 min, or greater than 50 g/10 min, or greater than 100 g/10 min, or greater than 200 g/10 min, or greater than 300 g/10 min, greater than 400 g/10 min, or greater than 500 g/10 min, or greater than 600 g/10 min, or greater than 700 g/10 min, or greater, than 800 g/10 min, or greater than 900 g/10 min, or greater than 1000 g/10 min, to 3000 g/10 min, or 2000 g/10 min, or 1500 g/10 min.

The ability of 3,6-di-substituted-1,2-phenylene aromatic diester to produce very high melt flow propylene-based polymer is unexpected. Applicant has surprisingly discovered that substitution at both the 3-position and at the 6-position of the phenylene group of structure (I) with small and/or linear hydrocarbyl groups unexpectedly results in an internal electron donor whose hydrogen response increases rapidly at elevated hydrogen level. Additionally, when at least one of the 4-position and/or 5-position is substituted, especially with a bulky hydrocarbyl group, catalyst activity and selectivity are significantly improved. Very high in-reactor grade propylene-based polymer (and propylene homopolymer in particular) using the present catalyst composition can be produced using catalysts made from the present internal electron donors containing of 3,6-di-substituted-1,2-phenylene aromatic diester of structure (I). For example, for propylene homopolymer with a MFR of 1000 g/10 min or greater can readily be obtained.

In an embodiment, the olefin in propylene. The process includes forming a propylene homopolymer having a xylene solubles content from about 0.5% to about 10%, or from about 1% to about 8%, or from about 1% to about 4%.

Polymeric Composition

The present disclosure provides a composition. In an embodiment, a polymeric composition is provided and includes a propylene-based polymer comprising a 3,6-di-substituted-1,2-phenylene aromatic diester of structure (I). The propylene-based polymer has a melt flow rate greater than 10 g/10 min, or greater than 50 g/10 min, or greater than 100 g/10 min, or greater than 200 g/10 min, or greater than 300 g/10 min, greater than 400 g/10 min, or greater than 500 g/10 min, or greater than 600 g/10 min, or greater than 700 g/10 min, or greater, than 800 g/10 min, or greater than 900 g/10 min, or greater than 1000 g/10 min, to 3000 g/10 min, or 2000 g/10 min, or 1500 g/10 min. In a further embodiment, the propylene-based polymer also has a xylene solubles content from 1 wt % to 4 wt %. Weight percent is based on total weight of the propylene-based polymer.

The 3,6-di-substituted-1,2-phenylene aromatic diester can be any compound having the structure (I) as previously disclosed herein.

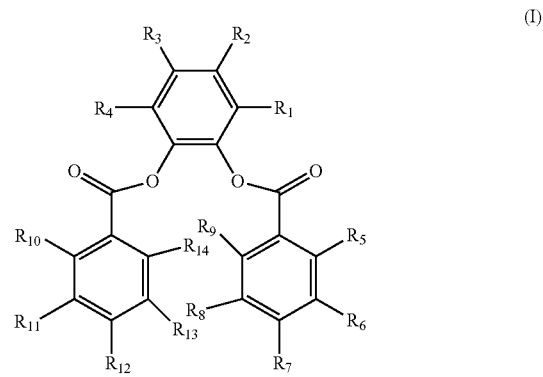

$R_1$-$R_{14}$ are the same or different. Each of $R_1$ and $R_4$ is selected from a hydrocarbyl group having 1 to 20 carbon atoms. Each of $R_2$ and $R_3$ is selected from hydrogen and a hydrocarbyl group having 1 to 20 carbon atoms. Each of $R_5$-$R_{14}$ is selected from hydrogen, a halogen, a hydrocarbyl group having 1 to 20 carbon atoms, and a hydrocarbyloxy group having 1 to 20 carbon atoms.

In an embodiment, $R_1$-$R_{14}$ are the same or different. Each of $R_1$ and $R_4$ is selected from a $C_1$-$C_8$ alkyl group, a $C_2$-$C_5$ alkenyl group, and combinations thereof. Each of $R_2$-$R_3$ and $R_5$-$R_{14}$ is selected from hydrogen, halogen, and a $C_1$-$C_{20}$ hydrocarbyl group or a $C_1$-$C_{20}$ hydrocarbyloxy group.

In an embodiment, at least one of $R_1$ and $R_4$ of the 3,6-di-substituted-1,2-phenylene aromatic diester (I) is a methyl group.

In an embodiment, each of $R_1$ and $R_4$ of the 3,6-di-substituted-1,2-phenylene aromatic diester (I) is a methyl group.

In an embodiment, each of $R_1$ and $R_4$ is a methyl group, $R_3$ is hydrogen, and $R_2$ is selected from an isopropyl group, a cyclopentyl group, a cyclohexyl group, an aryl group, an alkylaryl group, a tert-butyl group, and a 2,3,3-trimethylbutan-2-yl group.

In an embodiment, $R_2$ and $R_3$ are linked to form a cyclic structure.

In an embodiment, $R_5$-$R_{14}$ are hydrogen.

In an embodiment, $R_5$, $R_6$, $R_8$, $R_9$, $R_{10}$, $R_{11}$, $R_{13}$, and $R_{14}$ are hydrogen, and $R_7$ and $R_{12}$ are selected from fluorine, chlorine, a methyl group, and an ethyl group.

The propylene-based polymer is propylene copolymer or propylene homopolymer. In an embodiment, the propylene-based polymer is a propylene homopolymer.

In an embodiment, the formant propylene-based polymer has a weight percent comonomer content relative to propylene of from about 0.001% to about 20%, or from about 0.01% to about 15%, or from about 0.1% to about 10%.

In an embodiment, the propylene-based polymer is a propylene homopolymer and contains 3,6-dimethyl-1,2-phenylene dibenzoate, the propylene homopolymer having a MFR in the foregoing range of greater than 10 g/10 min to 3000 g/10 min, and a XS content from 1 wt % to 4 wt %.

In an embodiment, the propylene-based polymer is a propylene homopolymer and contains 3-methyl-6-isopropyl-1,2-phenylene dibenzoate, the propylene homopolymer having a MFR in the foregoing range of greater than 10 g/10 min to 3000 g/10 min, and a XS content from 1 wt % to 4 wt %.

In an embodiment, the propylene-based polymer is a propylene homopolymer and contains 3,6-dimethyl-4-isopropyl-1,2-phenylene dibenzoate, the propylene homopolymer having a MFR in the foregoing range of greater than 10 g/10 min to 3000 g/10 min, and a XS content from 1 wt % to 4 wt %.

The present procatalyst composition(s), catalyst composition(s), and propylene-based polymer(s) advantageously have the property of being phthalate-free, or otherwise void or devoid of phthalate and/or derivatives thereof.

The polymeric composition may comprise two or more embodiments disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 and 20 carbon atoms.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have 1 and 20 carbon atoms.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "primary alkyl group" has the structure —$CH_2R_1$ wherein $R_1$ is hydrogen or a substituted/unsubstituted hydrocarbyl group.

The term, "propylene-based polymer," as used herein, refers to a polymer that comprises a majority weight percent polymerized propylene monomer (based on the total amount of polymerizable monomers), and optionally may comprise at least one polymerized comonomer.

A "secondary alkyl group" has the structure —$CHR_1R_2$ wherein each of $R_1$ and $R_2$ is a substituted/unsubstituted hydrocarbyl group.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

A "tertiary alkyl group" has the structure —$CR_1R_2R_3$ wherein each of $R_1$, $R_2$, and $R_3$ is a substituted/unsubstituted hydrocarbyl group.

Test Methods

Final melting point $T_{MF}$ is the temperature to melt the most perfect crystal in the sample and is regarded as a measure for isotacticity and inherent polymer crystallizability. The test was conducted using a TA Q100 Differential Scanning calorimeter. A sample is heated from 0° C. to 240° C. at a rate of 80° C./min, cooled at the same rate to 0° C., then heated again at the same rate up to 150° C., held at 150° C. for 5 minutes and the heated from 150° C. to 180° C. at 1.25° C./min. The $T_{MF}$ is determined from this last cycle by calculating the onset of the baseline at the end of the heating curve.

Testing Procedure:
(1) Calibrate instrument with high purity indium as standard.
(2) Purge the instrument head/cell with a constant 50 ml/min flow rate of nitrogen constantly.
(3) Sample preparation:
   Compression mold 1.5 g of powder sample using a 30-G302H-18-CX Wabash Compression Molder (30 ton): (a) heat mixture at 230° C. for 2 minutes at contact; (b) compress the sample at the same temperature with 20 ton pressure for 1 minute; (c) cool the sample to 45° F. and hold for 2 minutes with 20 ton pressure; (d) cut the plaque into 4 of about the same size, stack them together, and repeat steps (a)-(c) in order to homogenize sample.
(4) Weigh a piece of sample (preferably between 5 to 8 mg) from the sample plaque and seal it in a standard aluminum sample pan. Place the sealed pan containing the sample on the sample side of the instrument head/cell and place an empty sealed pan in the reference side. If using the auto sampler, weigh out several different sample specimens and set up the machine for a sequence.
(5) Measurements:
   (i) Data storage: off
   (ii) Ramp 80.00° C./min to 240.00° C.
   (iii) Isothermal for 1.00 min
   (iv) Ramp 80.00° C./min to 0.00° C.
   (v) Isothermal for 1.00 min
   (vi) Ramp 80.00° C./min to 150.00° C.
   (vii) Isothermal for 5.00 min
   (viii) Data storage: on
   (ix) Ramp 1.25° C./min to 180.00° C.
   (x) End of method
(6) Calculation: $T_{MF}$ is determined by the interception of two lines. Draw one line from the base-line of high temperature. Draw another line from through the deflection of the curve close to the end of the curve at high temperature side.

Melt flow rate (MFR) is measured in accordance with ASTM D 1238-01 test method at 230° C. with a 2.16 kg weight for propylene-based polymers.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. Of the 2nd World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compress molded into 50 mm×100 mm×2 mm plaque. Samples are then cut into 19 mm square and loaded on the center of the bottom plate. The geometries of upper cone is (1) Cone angle: 5:42:20 (deg:min:I); (2) Diameter: 25 mm; (3) Truncation gap: 149 micron. The geometry of the bottom plate is 25 mm cylinder.

Testing Procedure:
(1) The cone & plate sample holder are heated in the ETC oven at 180° C. for 2 hours. Then the gap is zeroed under blanket of nitrogen gas.
(2) Cone is raised to 2.5 mm and sample loaded unto the top of the bottom plate.

(3) Start timing for 2 minutes.

(4) The upper cone is immediately lowered to slightly rest on top of the sample by observing the normal force.

(5) After two minutes the sample is squeezed down to 165 micron gap by lower the upper cone.

(6) The normal force is observed. When the normal force is down to <0.05 Newton the excess sample is removed from the edge of the cone and plate sample holder by a spatula.

(7) The upper cone is lowered again to the truncation gap which is 149 micron.

(8) An Oscillatory Frequency Sweep test is performed under these conditions:

Test delayed at 180° C. for 5 minutes.

Frequencies: 628.3 r/s to 0.1 r/s.

Data acquisition rate: 5 point/decade.

Strain: 10%

(9) When the test is completed the crossover modulus (Gc) is detected by the Rheology Advantage Data Analysis program furnished by TA Instruments.

(10) PDI=100,000÷ Gc (in Pa units).

Xylene Solubles (XS) is measured using a $^1$H NMR method as described in U.S. Pat. No. 5,539,309, the entire content of which is incorporated herein by reference.

By way of example and not by limitation, examples of the present disclosure will now be provided.

EXAMPLES

1. Procatalyst Preparation 3.00 g of MagTi-1 and 2.52 mmol of internal electron donor are charged into a flask equipped with mechanical stirring and with bottom filtration. 60 ml of a mixed solvent of $TiCl_4$ and chlorobenzene (1/1 by volume) is introduced into the flask (i.e., a first contact step). The mixture is heated to 115° C. and remains at the same temperature for 60 minutes with stirring at 250 rpm before filtering off the liquid. 60 ml of mixed solvent is added again and the reaction is allowed to continue at the same desired temperature for 30 minutes with stirring followed by filtration. This process is repeated once. 70 ml of iso-octane is used to wash the resultant solid at ambient temperature. After the solvent is removed by filtration, the solid is dried by $N_2$ flow or under vacuum.

Procatalyst C-9B is prepared by the same procedure except that another portion of 2.52 mmol of TED 9 is used in the second contact step. A "contact step" is halogenation of the procatalyst precursor in the presence of the internal electron donor, the reaction product of a contact step being a procatalyst composition (or a procatalyst intermediate) that is a combination of a magnesium moiety, a titanium moiety, complexed with the 3,6-di-substituted-1,2-phenylene aromatic diester (internal electron donor).

MagTi-1 is a mixed Mg/Ti precursor with composition of $Mg_3Ti(OEt)_8Cl_2$ (prepared according to example 1 in U.S. Pat. No. 6,825,146). Titanium content for each of the resultant catalyst compositions is listed in Table 1. The peaks for internal donors were assigned according to retention time from GC analysis.

TABLE 1

| | | Procatalyst Compositions | | | |
|---|---|---|---|---|---|
| Ref # | IED | Name | Ti (%) | OEt (%) | IED (%) |
| C-1 | 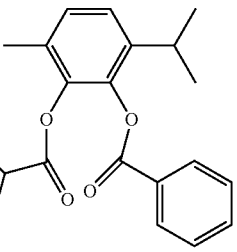 | 3-methyl-6-isopropyl-1,2-phenylene dibenzoate | 3.59 | 0.35 | 16.64 |
| C-2 | 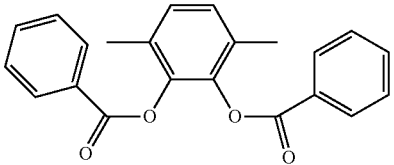 | 3,6-dimethyl-1,2-phenylene dibenzoate | 2.73 | 0.35 | 8.65 |
| C-3 | 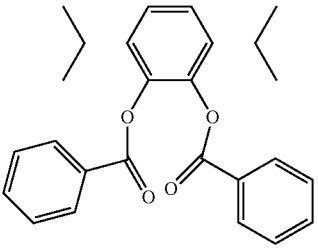 | 3,6-di-tert-butyl-1,2-phenylene dibenzoate | 3.11 | 0.37 | 9.07 |

TABLE 1-continued

Procatalyst Compositions

| Ref # | IED | Name | Ti (%) | OEt (%) | IED (%) |
|---|---|---|---|---|---|
| C-4 | | 3,4,6-triisopropyl-1,2-phenylene dibenzoate | 4.69 | 0.36 | 7.40 |
| C-9A | | 3,6-dimethyl-4-isopropyl-1,2-phenylene dibenzoate | NM | NM | NM |
| C-9B | | 3,6-dimethyl-4-isopropyl-1,2-phenylene dibenzoate | NM | NM | NM |
| C-5* | | 3-methyl-1,2-phenylene dibenzoate | 3.42 | 0.37 | 3.03 |
| C-6* | | 3-tert-butyl-1,2-phenylene dibenzoate | 3.64 | 0.35 | 14.06 |
| C-7* | | 3-methyl-5-tert-butyl-1,2-phenylene dibenzoate | 3.88 | 0.36 | 15.99 |

TABLE 1-continued

Procatalyst Compositions

| Ref # | IED | Name | Ti (%) | OEt (%) | IED (%) |
|---|---|---|---|---|---|
| C-8* | 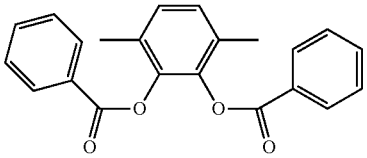 | 2,3-naphthalene dibenzoate | 3.49 | 0.19 | NM |

\* = Comparative
NM = Not Measured
Wt % based on total wt procatalyst composition 2. Polymerization Polymerization is performed in liquid propylene in a 1-gallon autoclave. After conditioning, the reactor is charged with 1375 g of propylene and a targeted amount of hydrogen and brought to 62° C. 0.25 mmol of external donor is added to 7.2 ml of a 0.27 M triethylaluminum solution in isooctane, followed by addition of a 5.0 wt % procatalyst slurry in mineral oil (actual solid weight is indicated in data tables below). The mixture is premixed at ambient temperature for 20 minutes before being injected into the reactor to initiate the polymerization. The premixed catalyst components are flushed into the reactor with isooctane using a high pressure catalyst injection pump. After the exotherm, the temperature is maintained at 67° C. Total polymerization time is 1 hour.

Polymer Testing

Polymer samples are tested for melt flow rate (MFR), xylene solubles (XS) (using $^1$H NMR method), polydispersity index (PDI), and final melting point ($T_{MF}$).

Process conditions and polymer properties are provided in Table 2 below.

Table 2A below shows comparative data from co-pending application Ser. No. 12/650,834 filed on Dec. 31, 2009. The hydrogen response for catalyst composition containing 3,6-disubstituted 1,2-phenylene dibenzoate (3,6-dimethyl-1,2-phenylene dibenzoate) does not exhibit unusual hydrogen response capability when compared to the 3,5- and 4,5-disubstituted 1,2-phenylene dibenzoates in Table 2A. For example, when DCPDMS is used as EED, the MFR is 1.8 g/10 min for the 3,6-disubstituted 1,2-phenylene dibenzoate ($H_2$/propylene=0.00273) compared to an MFR of 6.1 g/10 min for the 4,5-di-substituted 1,2-phenylene dibenzoate ($H_2$/propylene=0.00820) assuming MFR increases linearly with $H_2$/propylene ratio.

Table 2A shows data from co-pending U.S. patent application Ser. No. 12/650,834.

TABLE 2A

| IED | Precursor | EED | Procatalyst (mg) | TEAl (mmol) | Al/SCA | $H_2$ (mmol) | $H_2/C_3$ (mol/mol) ×1000 | Activity (kg/g-hr) | Melt Flow (g/10 min) | XS (%) | PDI | Tmf (° C.) |
|---|---|---|---|---|---|---|---|---|---|---|---|---|
| 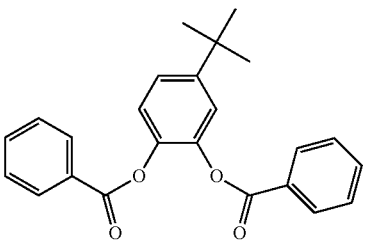 | MagTi-1 | NPTMS | 16.7 | 2 | 8 | 1000 | 1.82 | 17.1 | 1.6 | 1.6 | 4.42 | 171.78 |
| | | DCPDMS | 16.7 | 2 | 8 | 1500 | 2.73 | 19.3 | 1.8 | 3.0 | 5.07 | 171.99 |
| | MagTi-1 | NPTMS | 8.4 | 2 | 8 | 3000 | 5.47 | 40.0 | 2.1 | 1.6 | 5.36 | 170.85 |
| | | DCPDMS | 8.4 | 2 | 8 | 4500 | 9.20 | 43.3 | 1.3 | 2.4 | 5.95 | 172.11 |
| | SHAC™ 310 | NPTMS | 16.7 | 2 | 8 | 300 | 5.47 | 27.8 | 1.7 | 3.2 | 6.09 | 171.20 |
| | | DCPDMS | 16.7 | 2 | 8 | 4500 | 8.20 | 28.9 | 3.8 | 5.2 | 7.17 | 171.26 |

TABLE 2A-continued

| IED | Precursor | EED | Pro-catalyst (mg) | TEAl (mmol) | Al/SCA | H₂ (mmol) | H₂/C₃ (mol/mol) ×1000 | Activity (kg/g-hr) | Melt Flow (g/10 min) | XS (%) | PDI | Tmf (° C.) |
|---|---|---|---|---|---|---|---|---|---|---|---|---|
| (structure) | MagTi-1 | DCPDMS | 8.4 | 2 | 8 | 2500 | 4.55 | 51.2 | 1.2 | 2.2 | 5.56 | 172.19 |
| | | DCPDMS | 8.4 | 2 | 8 | 5000 | 9.10 | 59.4 | 3.3 | 2.4 | 5.62 | 171.95 |
| | SHAC™ 310 | DCPDMS | 11.6 | 2 | 8 | 1250 | 2.28 | 25.3 | 1.1 | 4.5 | 6.31 | 171.86 |
| | | NPTMS | 11.6 | 2 | 8 | 800 | 1.46 | 22.3 | 0.7 | 2.8 | | |
| (structure) | MagTi-1 | NPTMS | 16.7 | 2 | 8 | 3000 | 5.47 | 25.5 | 6.8 | 4.1 | 4.98 | 169.65 |
| | | DCPDMS | 16.7 | 2 | 8 | 4500 | 8.20 | 20.3 | 3.9 | 4.0 | 6.01 | 171.26 |
| | SHAC™ 310 | NPTMS | 16.7 | 2 | 8 | 3000 | 5.47 | 16.3 | 6.1 | 5.2 | 6.26 | 169.96 |
| | | DCPDMS | 16.7 | 2 | 8 | 4500 | 8.20 | 32.0 | 6.1 | 7.6 | 7.45 | 170.47 |

Turning to Table 2B (properties from the present catalysts containing 3,6-di-substituted-1,2-phenylene dibenzoate), Applicant unexpectedly discovered that hydrogen response dramatically increases for catalyst compositions containing 3,6-di-substituted phenylene dibenzoate when the $H_2/C_3$ mole ratio is greater than 0.005, including the ratio from 0.005 to less than 0.5, or less than 0.1. For the catalyst with procatalyst C-2 (3,6-dimethyl-1,2-phenylene dibenzoate), at low $H_2/C_3$ mole ratio (as shown in Table 2A above), hydrogen response is similar to other substituted 1,2-phenylene dibenzoates. Surprisingly, at elevated $H_2/C_3$ mole ratio ($H_2/C_3$ from 0.005 to less than 0.5, or less than 0.1), the increase in MFR for 3,6-di-substituted-1,2-phenylene dibenzoate increases exponentially, compared to other 1,2-phenylene dibenzoates which lack the 3,6-disubstitution of the phenylene moiety. This dramatic increase in MFR for 3,6-di-substituted-1,2-phenylene dibenzoate when $H_2/C_3$ is greater than 0.005 is unexpected and is unpredictable.

Data in Table 2B also show high hydrogen response for other 3,6-disubstituted 1,2-phenylene dibenzoate internal electron donors (C-1, C-3, C-4 and C-9). Combined with high hydrogen response external donors (such as those EEDs shown in Table 2B), the present catalyst compositions containing 3,6-di-substituted phenylene dibenzoate internal electron donors have the capability of producing in-reactor propylene-based polymer (propylene homopolymer in particular) with MFR greater than 100, or greater than 500, or greater than 1000 g/10 min or more (Table 2B).

TABLE 2B

Catalyst performance and polymer properties

| External Donor | H₂ (scc) | H₂/C₃ (mol/mol) × 1000 | Run Number | Pro-catalyst Number | Pro-catalyst (mg) | Activity (kg/g-h) | MFR (g/10 min) | XS (%) | PDI | $T_{MF}$ (° C.) |
|---|---|---|---|---|---|---|---|---|---|---|
| N | 3000 | 5.47 | R-1-1 | C-1 | 16.0 | 23.6 | 18.0 | 2.37 | 4.69 | 169.82 |
| | | | R-3-1 | C-3 | 14.9 | 25.4 | 41.3 | 8.16 | | |
| | | | R-4-1 | C-4 | 15.4 | 28.1 | 31.3 | 6.21 | 4.69 | 168.73 |
| | | | R-5-1* | C-5* | 14.8 | 24.0 | 5.2 | 2.47 | 5.05 | 170.48 |
| | | | R-6-1* | C-6* | 7.9 | 42.8 | 2.1 | 1.63 | 5.36 | 170.85 |
| | | | R-7-1* | C-7* | 4.5 | 33.9 | 4.7 | 1.12 | 4.73 | 171.17 |
| | | | R-8-1* | C-8* | 16.7 | 25.5 | 6.8 | 4.06 | 4.98 | 169.65 |
| D | 4500 | 8.20 | R-1-2 | C-1 | 16.0 | 26.8 | 8.1 | 4.47 | 5.75 | 170.74 |
| | | | R-3-2 | C-3 | 7.5 | 26.2 | 46.0 | 7.25 | | |
| | | | R-4-2 | C-4 | 15.4 | 43.1 | 13.5 | 8.02 | 5.82 | 170.12 |
| | | | R-9A-2 | C-9A | 4.3 | 46.0 | 15.5 | 2.26 | | |
| | | | R-9B-2 | C-9B | 4.3 | 74.2 | 9.7 | 2.24 | | |
| | | | R-5-2* | C-5* | 14.8 | 32.8 | 5.3 | 4.36 | 5.73 | 170.62 |
| | | | R-6-2* | C-6* | 7.9 | 46.3 | 1.3 | 2.37 | 5.95 | 172.11 |
| | | | R-7-2* | C-7* | 4.5 | 39.3 | 3.8 | 1.58 | 5.40 | 172.23 |
| | | | R-8-2* | C-8* | 8.4 | 40.4 | 3.9 | 3.97 | 6.01 | 171.26 |

TABLE 2B-continued

Catalyst performance and polymer properties

| External Donor | $H_2$ (scc) | $H_2/C_3$ (mol/mol) × 1000 | Run Number | Pro-catalyst Number | Pro-catalyst (mg) | Activity (kg/g-h) | MFR (g/10 min) | XS (%) | PDI | $T_{MF}$ (° C.) |
|---|---|---|---|---|---|---|---|---|---|---|
| D/IPM 40/60 | 4500 | 8.20 | R-1-3 | C-1 | 8.0 | 25.2 | 19.8 | 1.51 | 5.28 | 170.44 |
| | | | R-2-3 | C-2 | 8.0 | 17.5 | 29.4 | 2.10 | 5.06 | 170.73 |
| | | | R-5-3* | C-5* | 7.4 | 36.2 | 7.3 | 4.10 | 5.80 | 170.84 |
| | | | R-6-3* | C-6* | 7.9 | 52.2 | 2.2 | 1.80 | 6.35 | 171.66 |
| | | | R-7-3* | C-7* | 7.8 | 33.8 | 3.8 | 1.02 | 5.41 | 171.42 |
| | | | R-8-3* | C-8* | 8.4 | 39.3 | 10.7 | 6.54 | 6.04 | 170.33 |
| D/IPM 40/60 | 20000 | 36.44 | R-1-4 | C-1 | 8.0 | 29.7 | 332.2 | 1.77 | | 169.09 |
| | | | R-2-4 | C-2 | 8.0 | 20.6 | 488.1 | 2.25 | | 168.92 |
| | | | R-5-4* | C-5* | 7.4 | 24.9 | 90.9 | 2.43 | | 170.17 |
| | | | R-6-4* | C-6* | 7.9 | 25.6 | 36.8 | 0.91 | 5.28 | 170.61 |
| | | | R-7-4* | C-7* | 7.8 | 27.2 | 46.4 | 0.84 | 5.10 | 170.64 |
| | | | R-8-4* | C-8* | 8.4 | 20.1 | 85.3 | 4.43 | 5.04 | 169.63 |
| N/IPM 10/90 | 3000 | 5.47 | R-1-5 | C-1 | 8.0 | 31.8 | 26.9 | 3.30 | 4.69 | 169.10 |
| | | | R-2-5 | C-2 | 8.0 | 18.0 | 30.3 | 3.92 | 4.73 | 170.21 |
| | | | R-5-5* | C-5* | 7.4 | 31.7 | 9.5 | 6.43 | 5.38 | 169.06 |
| | | | R-6-5* | C-6* | 7.9 | 24.8 | 2.2 | 1.24 | 5.56 | 170.59 |
| | | | R-7-5* | C-7* | 7.8 | 24.7 | 3.5 | 1.54 | 4.76 | 170.46 |
| | | | R-8-5* | C-8* | 8.4 | 32.3 | 15.4 | 9.83 | 5.25 | 169.00 |
| N/IPM 10/90 | 20000 | 36.44 | R-1-6 | C-1 | 8.0 | 31.6 | 978.3 | 3.58 | | 167.35 |
| | | | R-2-7 | C-2 | 8.0 | 14.9 | 1358.9 | 2.86 | | 167.79 |
| | | | R-5-6* | C-5* | 7.4 | 21.7 | 317.2 | 4.55 | | 168.29 |
| | | | R-6-6* | C-6* | 7.9 | 35.9 | 199.6 | 2.98 | | 169.03 |
| | | | R-7-6* | C-7* | 7.8 | 12.2 | 141.2 | 1.24 | | 170.25 |
| | | | R-8-6* | C-8* | 8.4 | 20.1 | 422.1 | 7.52 | | |
| D/NPTES/IPM 12/28/60 | 4500 | 8.20 | R-1-7 | C-1 | 8.0 | 31.1 | 38.6 | 2.67 | 4.98 | 169.22 |
| | | | R-2-7 | C-2 | 8.0 | 16.8 | 42.1 | 2.25 | 4.88 | 170.53 |
| | | | R-5-7* | C-5* | 7.4 | 28.9 | 12.6 | 4.55 | 5.41 | 170.23 |
| | | | R-6-7* | C-6* | 7.9 | 40.5 | 2.2 | 2.05 | 6.08 | 170.84 |
| | | | R-7-7* | C-7* | 7.8 | 33.3 | 4.9 | 1.31 | 5.39 | 171.66 |
| D/NPTES/IPM 12/28/60 | 20000 | 36.44 | R-1-8 | C-1 | 8.0 | 22.5 | 702.3 | 1.44 | | 168.18 |
| | | | R-2-8 | C-2 | 8.0 | 14.2 | 638.8 | 2.07 | | 168.72 |
| | | | R-5-8* | C-5* | 7.4 | 19.9 | 154.9 | 3.26 | | 169.12 |
| | | | R-6-8* | C-6* | 7.9 | 20.6 | 57.9 | 1.12 | 5.50 | 170.77 |
| | | | R-7-8* | C-7* | 7.8 | 28.2 | 78.5 | 1.06 | 4.67 | 170.38 |

*= Comparative
D = Dicyclopentyldimethoxysilane
IPM = Isopropyl myristate
N = N-propyltrimethoxy silane
NPTES = N-propyhriethoxysilane Results A comparison between 3-methyl-6-isopropyl-1,2-phenylene dibenzoate (C-1) and 3,6-dimethyl-1,2-phenylene dibenzoate (C-2), which only differs in one methyl group vs. one isopropyl group, reveals that a larger group at the 6-position reduces hydrogen response. However, 3-methyl-6-isopropyl-1,2-phenylene dibenzoate (C-1) still has higher hydrogen response when compared to C-5 through C-8. In addition, polymer isotacticity (XS) is also compromised with the larger alkyl group. Even greater XS is obtained when both the 3-position and the 6-position are occupied by bulky isopropyl or tert-butyl groups (3,6-di-tert-butyl-1,2-phenylene dibenzoate (C-3) and 3,4,6-triisopropyl-1,2-phenylene dibenzoate (C-4)).

When an isopropyl group is introduced to the 4-position of the phenylene group (C-9), an unexpected and substantial improvement in (i) catalyst activity and (ii) selectivity is realized at the same time. C-9 also exhibits the advantage of high hydrogen response due to the 3,6-di-substitution of the phenylene moiety.

SUMMARY

Substitution at both of the 3-position and the 6-position of the phenylene group in a phenylene dibenzoate compound unexpectedly results in an internal electron donor that possesses extremely high hydrogen response capability in the $H_2/C_3$ mole ratio range from 0.005 to 0.1 or from 0.005 to 0.2, or to 0.5 and greater. Very high in-reactor grade propylene-based polymer can be produced using catalysts made from such internal electron donors. For propylene homopolymer, the MFR can easily reach 1000 g/10 min or beyond.

Smaller substituents further enhance the hydrogen response while simultaneously lowering XS.

Small substituents are also needed in order to maintain high isotacticity.

Substitution at the 4-position and optionally at the 5-position, especially with a bulky hydrocarbyl group, improves catalyst activity and selectivity.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A catalyst composition comprising:
   a magnesium moiety and a substituted-1,2-phenylene dibenzoate having structure (I),

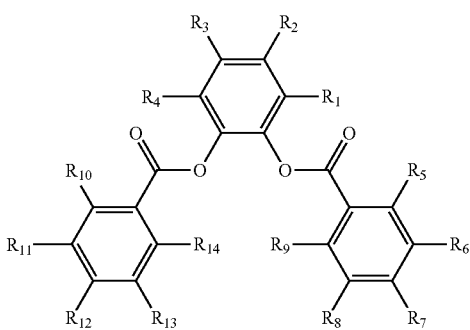

wherein:

R₁-R₁₄ are the same or different;

R₁ and R₄ are independently selected from the group consisting of C1 to C8 alkyl and C2 to C8 alkenyl;

one of R₂ and R₃ is H and the other is a C1 to C20 hydrocarbyl, the hydrocarbyl comprising a cycloalkyl moiety, a cycloalkenyl moiety, or a cycloalkadienyl moiety; and each of R₅-R₁₄ is selected from the group consisting of H, halogen, C1 to C20 hydrocarbyl, and C1 to C20 hydrocarbyloxy.

2. The procatalyst composition of claim 1 further comprising a magnesium moiety, a titanium moiety.

3. The procatalyst composition of claim 2, wherein the magnesium moiety comprises a magnesium halide.

4. The procatalyst composition of claim 1, wherein R₁ and R₄ are the same.

5. The procatalyst composition of claim 1, wherein R₁ and R₄ are linear hydrocarbyl.

6. The procatalyst composition of claim 1, wherein R₁ and R₄ are methyl.

7. The procatalyst composition of claim 1, wherein at least one of R₂ or R₃ is isopropyl, tert-butyl, 2,3,3-trimethylbutan-2-yl, cyclopentyl, or cyclohexyl.

8. A catalyst composition comprising the procatalyst composition of claim 1 and a cocatalyst.

9. The catalyst composition of claim 8, wherein the cocatalyst comprises an alkyl aluminum compound.

10. The catalyst composition of claim 8 further comprising an external electron donor.

11. The catalyst composition of claim 10, wherein the external electron donor comprises an alkoxysilane.

12. The catalyst composition of claim 10, wherein the external electron donor comprises dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, or dimethyldimethoxysilane.

13. The catalyst composition of claim 12, wherein the external electron donor comprises dicyclopentyldimethoxysilane, methylcyclohexyldimethoxysilane, or n-propyltrimethoxysilane.

14. The catalyst composition of claim 8 further containing an activity limiting agent.

* * * * *